United States Patent Office 3,337,420
Patented Aug. 22, 1967

3,337,420
KIDNEY BEAN SHAPED WATER REGENERATION COMPRESSION AND CENTRIFUGAL DISTILLATION APPARATUS
Jack D. Zeff, Highland Park, Robert A. Bambenek, Glenview, and Cyril M. Tomsic, Chicago, Ill., assignors, by mesne assignments, to the United States of America as represented by the Secretary of the Navy
Filed Jan. 23, 1964, Ser. No. 339,829
2 Claims. (Cl. 202—181)

ABSTRACT OF THE DISCLOSURE

A water regeneration system operable under various gravity and acceleration conditions and comprising a primary compression distillation system including heat exchanging centrifuge means which is kidney bean shaped in vertical section so that liquid level sensing means disposed therein and forming part of flow control circuitry is responsive to the quantity of liquid therein irrespective of changes in gravity and/or upward acceleration of the apparatus.

---

This invention relates to a water regeneration system and specifically to a system for recovering potable water from human urine and from utility water. The invention is designed to be utilized by a space crew traveling in outer space and they are therefore required to recover and conserve materials for optimum self-sufficiency while in flight.

As experiments continue and equipment is designed to carry men into space in the near future, the problems encountered in sustaining life during the necessary periods for flight are many. One of the basic needs, of course, is that of drinking water. Since conventional water facilities are not practical in a compact space vehicle, some means to provide such water becomes important. A valuable source would involve a practical means to recover waste liquid. Several sources of supply are encountered in a space vehicle. Water used for cooking and washing purposes, if recoverable, could serve the dual purpose of solving the problems of elimination of waste, and providing a source of water supply. Also, urine and other liquid waste, if collected and processed to be regenerated as pure water could help solve such problems. The instant invention is therefore designed to accomplish these ends.

On object of the invention is to regenerate potable water from liquid wastes.

Another object is to increase the efficiency of a space vehicle by providing the means to treat and recycle liquids which have been utilized by the occupants of such space vehicle in their normal human functions. By so recovering what would normally be wastes that must be disposed of, more compact and efficient equipment is made possible.

It is still another object to prevent contamination of the purified water in the recovery process regardless of conditions caused by changes in the environmental gravity field.

And it is yet another object to provide an emergency water regeneration system capable of being substituted for the compression distillation water regeneration in the event that a failure in this process occurs.

Other objects and many of the attendant advantages of this invention will be readily appreciated as the same becomes better understood by reference to the following detailed description when considered in connection with the accompanying drawings wherein.

Figure 3:
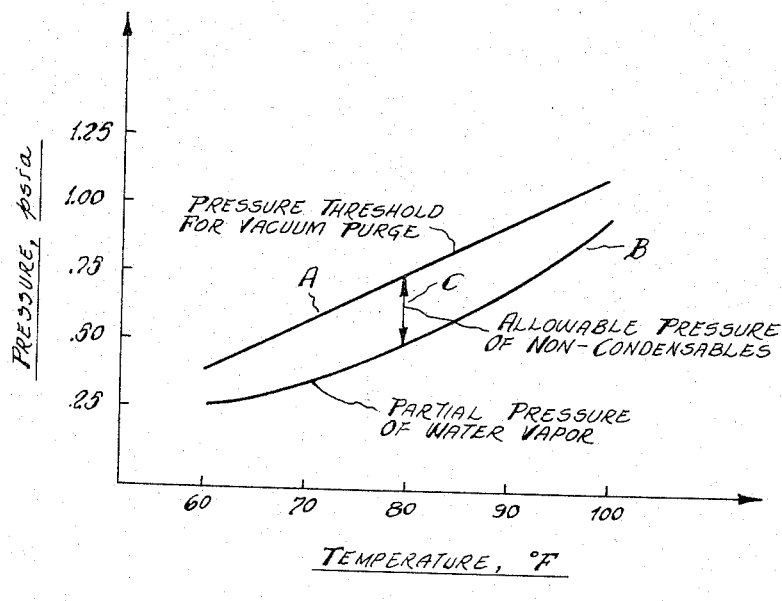

FIG. 3 discloses a vacuum purge graph relating to the invention.

The purpose of the water regeneration system is to recover potable water from human urine and utility water. Two systems are provided for reliability: one for normal operation and one for emergency use. The water regeneration system operates on the principle of compression distillation, and the emergency water regeneration system operates on the principle of vacuum distillation.

Figure 1:
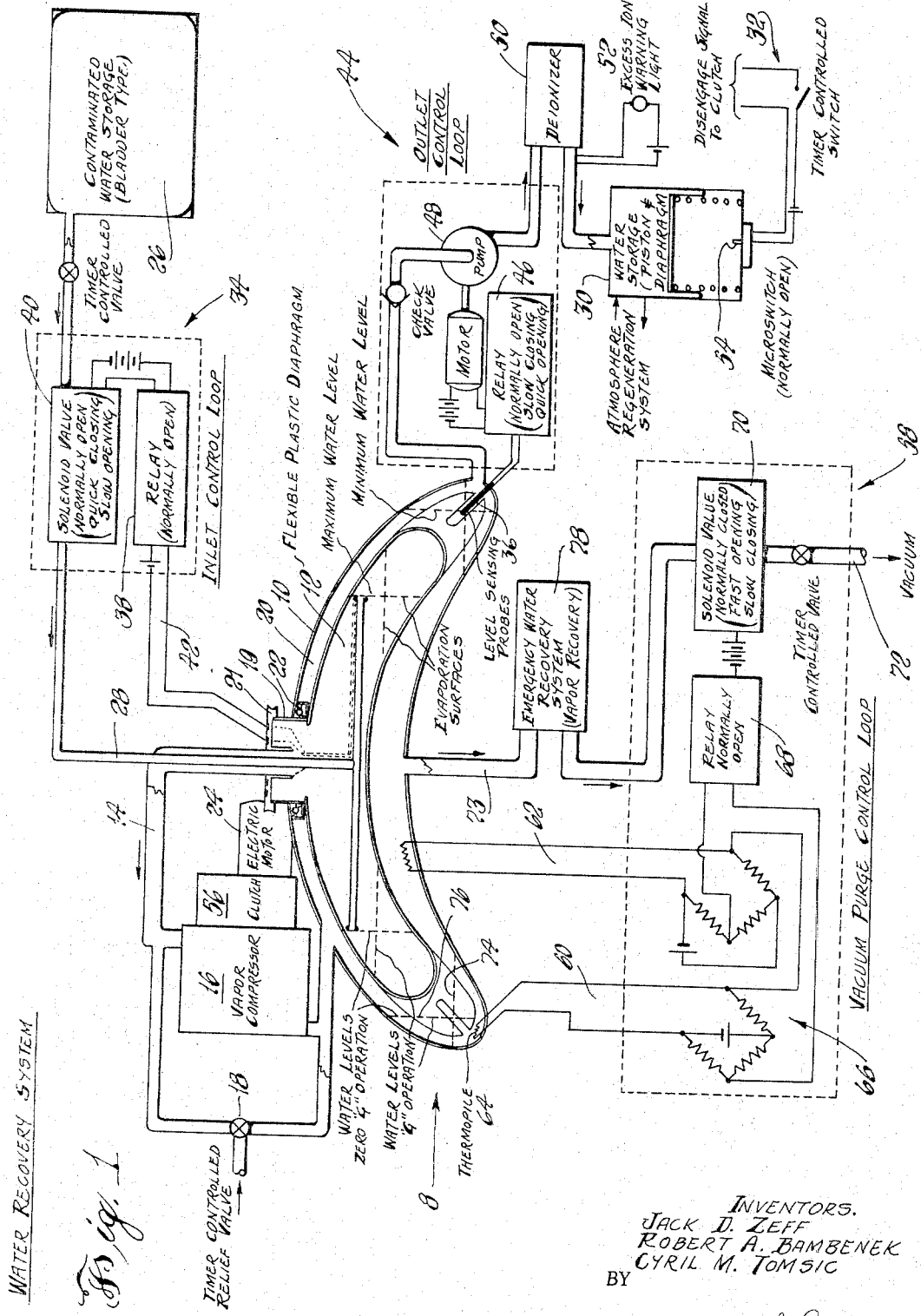
FIG. 1 is a schematic illustration of a preferred embodiment of a water recovery system.

The purification of waste water is accomplished in the compression distillation system by vaporization and subsequent condensation of water vapor. As shown in FIG. 1, the urine in the stationary bowl 10 is vaporized within the rotating inner bowl 12. The vapor is drawn off, via conduit 14, compressed, and transferred to the stationary outer bowl 10 by the vapor compressor 16. This is controlled by a time relief valve 18 which is actuated to allow the compressed vapor to enter the space 20 between the outer wall 10 and the inner wall 12 of the vaporizer. An annular neck extension 19 on said inner shell 12 serves to provide the inlet opening for water to be regenerated, as well as to retain the outer shell 10. A worm gear 21 forms the cover for the inner shell and provides the means to rotate it. Ball bearings 22 permit smooth rotation of the inner bowl by the motor 24. In the outer bowl 10, the vapor, which has been superheated by the compresor 16, loses this energy to the inner bowl 12, and begins to condense. The energy given up by the condensing vapor in the outer bowl is used to vaporize water from waste water in the inner bowl. The only energy necessary to maintain the cycle in steady state is the compressor work.

To a certain extent, the equipment is designed for continuous operation. Make-up waste water from the storage tank 26 is periodically fed to the inner bowl 12 via the conduit 28 to maintain the liquid level there, and, as distilled water is collected in the outer bowl, it is periodically removed to a water storage vessel 30. The removal of solids which accumulate in the inner bowl, however, is not automated. Provisions have been made in the design for a timer controlled cycle 32 that would shut down the unit every twenty-four hours, to allow manual removal of the accrued solids.

Figure 2:
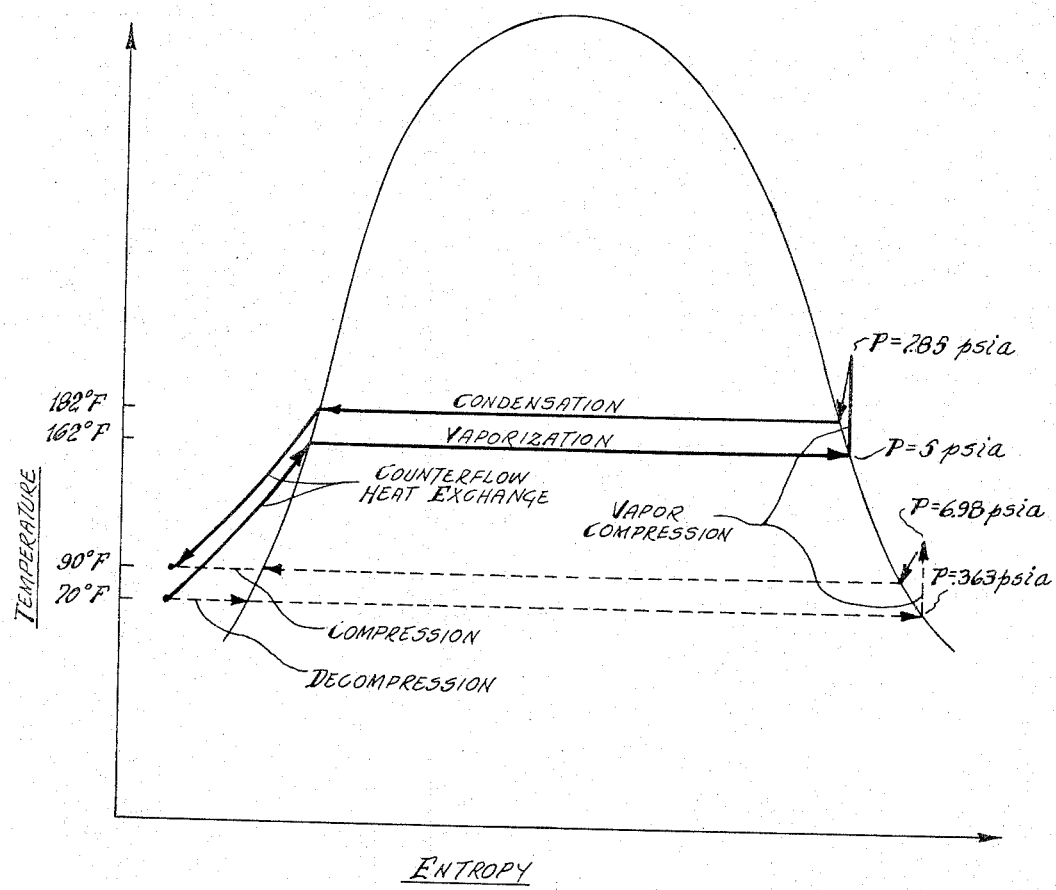
FIG. 2 is a temperature-entropy diagram of the water recovery system.

The operation of a compression-distillation system involves the following thermodynamic processes and is illustrated in FIG. 2.

(1) Beginning with water at cabin temperature and pressure, obtain saturated liquid by variation of temperature and/or pressure.

(2) Constant pressure heat addition to obtain saturated vapor.

(3) Isentropic compression to obtain superheated vapor.

(4) Constant pressure heat rejection to obtain saturated liquid.

(5) Variation of temperature and/or pressure to obtain water at cabin pressure and near cabin temperature.

Because of the vapor compression, the heat rejected in process 4 is at a higher temperature than the heat added in process 2, and therefore, direct heat transfer may be used to supply the necessary latent heat of vaporization. In terms of design, this would indicate that evaporating and condensing chambers should be in intimate contact.

The optimum design solution for processes 1 and 5 is not quite so obvious. Beginning with water at cabin temperature and pressure (here assumed to be 70° F. and 5 p.s.i.a.), saturated liquid may be obtained by raising the temperature to 162° F. (at a pressure of 5 p.s.i.a.), lowering the temperature to 0.363 p.s.i.a. (at a temperature of 70° F.) or adjusting both temperature and pressure to saturation conditions within this range. Saturation conditions outside this range (i.e., pressure below 0.363 p.s.i.a or temperatures above 162° F.) are not considered because of the obvious increase of effect that would be necessary.

Assuming, for the moment, that the saturation process is constant pressure heat addition to 162° F., the necessary heat could be obtained by cooling the condensed water in a counterflow heat exchanger. Thus, one piece of equipment would accomplish the preliminary saturation and final desaturation of the fluid.

If the saturation process were constant temperature pressure reduction to 0.363 p.s.i.a., the necessary low pressures could be obtained by exhausting the cabin gas within the evaporator and condenser to vacuum (presumed available). In this case, desaturation would involve compression of the distillate to cabin pressure, which could be done by a pump or by removing the distillate from the condenser and exposing it to cabin pressure.

If the saturation process were to consist of a combination of these two processes, both heat exchanger and pressure reduction equipment would have to be supplied. The size of the heat exchanger depends on its capacity, and would thus be smaller for a hybrid system. However, the size and complication of the pressure reduction equipment is essentially independent of capacity because it consists merely of controls for releasing cabin gas to vacuum. We are led to the conclusion that a hybrid system would be more bulky and complicated than either the simple heating or simple pressure reduction approach. For this reason, only these two approaches are considered.

If the water is brought to saturation conditions by a constant pressure heat addition to 162° F., and desaturated after distillation by a constant pressure heat rejection, all of the processes performed (vaporization, compression, and condensation) must be performed at this high temperature. However, if the water is brought to saturation conditions by a constant temperature process of pressure reduction to 0.363 p.s.i.a., and desaturated after distillation by repressuring, all of the intermediate processes must be performed at this lower pressure. Thus, the choice between the two processes from a design standpoint, is complicated by the fact that the operating temperatures and pressures of the entire cycle are affected. FIG. 2 is a temperature entropy diagram illustrating the difference between the two cycles.

The choice between the high temperature cycle and the low pressure cycle is complicated by the fact that the operating conditions of the entire cycle are affected by the choice. The system performance with respect to power consumption, heat rejection, weight, reliability, and distillate quality are all affected, and must enter into consideration.

The mechanical power requirements of the system are composed of the compressor work, bearing friction, liquid friction, and control power. For the high temperature system, the compressor work $W$ (based on a condenser-evaporator temperature difference of 20° F.) is:

$$W = \frac{P_1 V_1}{K-1}\left[\left(\frac{P_2}{P_1}\right)^{\frac{1-K}{K}} - 1\right]$$

$$= \frac{4.971(144)(73.92)}{1.333-1}\left[\left(\frac{4.971}{7.850}\right)^{\frac{1-1.333}{1.333}} - 1\right]$$

$$= 19{,}226 \ \frac{\text{ft.-lb.}}{\text{lb.}}$$

where:

$P_1$ and $V_1$ are the pressure and volume of the vapor before compression, $K$ is a constant of isentropic compression of water vapor, and $P_2$ is the pressure of the vapor after compression.

Assuming a system flow rate of 3300 grams/day, the compressor power requirement is:

$$P = \frac{W}{33{,}000} = \frac{19{,}226}{33{,}000}\left(\frac{3300}{(454)(24)(60)}\right)$$

$$= 0.008 \text{ H.P. or } 6.0 \text{ watts}$$

The other mechanical power requirements of the system are negligible, considering that the centrifuge is run at low speed (50–100 r.p.m.) and with no gravitational load on the bearings. The controls may be designed so that they are normally deenergized. However, power must be used to heat the system at the beginning of the cycle. Assuming five pounds of water is to be heated to 160° F. from 70° F., 450 B.t.u. must be supplied, which would amount to some 263 watts over a 30-minute period. In addition, continuous power at a lower wattage would be necessary to maintain the high temperatures. The energy input of the compressor, 6.0 watts, is used, in effect, to heat the distillate.

The mechanical power requirements of the low-pressure system are somewhat higher. The compressor power requirement, computed on the same basis, is:

$$P = 0.011 \text{ H.P. or } 8.2 \text{ watts}$$

More bearing friction may be expected here, because the centrifuge bearing is under pressure loads. Also, pump work in removing the distillate must be supplied. The pump work on a steady-state basis, is of the order of magnitude of bearing and fluid friction, and is therefore not computed. The controls are once again, normally deenergized. No power is required to start the system or maintain it in steady state.

In comparing the two systems on the basis of power requirements, the principal difference lies in the power that is required to heat the high temperature system to its operating temperature and to maintain this temperature. The other items entering into the total power requirements such as pump work, compressor work, and friction, are very nearly the same for both systems. The low-pressure system, therefore, is preferable from a power consumption standpoint.

All of the power that is supplied to operate either the high-temperature or low-pressure distillation cycle will eventually be converted into heat and transferred to the cabin. This heat must be rejected by means of radiation from the space vehicle; and, therefore, a larger power consumption for a given distillation system implies that the capacity of the radiation equipment must be correspondingly higher. Since the high temperature distillation cycle has a power requirement that is more than 450 B.t.u./day greater than the power requirement for the low pressure distillation cycle, there would be an added penalty on the high-temperature system of the weight and bulk of the equipment necessary to reject this heat from the vehicle. The low-pressure system, therefore, is preferable on the basis of heat rejection.

One of the differences between the two systems, on a weight basis, lies in the fact that the high temperature system requires a counterflow heat exchanger, whereas the low pressure system requires vacuum purge control equipment.

The counterflow heat exchanger is required to take the incoming stream at 70° F. and the distillate stream at 180° F. and allow heat transfer so that the incoming stream reaches 160° F. and the outgoing stream reaches 90° F., with a mass flow rate of 0.9 lb./hr. A preliminary weight estimate would place the weight of this unit at 2 to 3 pounds.

The vacuum purge control equipment would consist of a solenoid valve, relay, and sensing elements. The weight of this equipment, in the final design, should be no more than ½ pound.

The high temperature system requires insulation to maintain the high temperatures. The low pressure system would have to be more rigid in order to sustain the loads imposed by the pressure difference. The weight requirement is about the same.

From an overall standpoint, the low pressure system appears to have a slight weight advantage.

The low pressure system consists of a combination double bowl centrifuge and heat exchanger 8 (which serve as the evaporating and condensing chambers), a vapor compressor 16, an electric motor 24, to drive the centrifuge and compressor, and associated control equipment to make the operation of the system automatic.

The two bowls of the centrifuge are in the form of curved shells, because they must function as a centrifuge, heat exchanger, and pressure vessel. The inside of the inner bowl is covered by a thin diaphragm (not visible in the drawing) to facilitate removal and storage of collected solids. The inner bowl 12 rotates via bearings 22, and vanes on the outside of the inner bowl 12 spin the distillate in the outer bowl 10, which is stationary.

The vapor compressor 16 is a high-volume, low pressure difference compressor. A variable displacement or Root's-type compressor would probably be best suited for this application. In either case, the compressor should operate at high speed (5000–10,000 r.p.m.) to avoid the necessity of a speed reducer, from the motor, and to provide the necessary high volume flow within a compact envelope. The motor 24 may also be used to drive the centrifuge 8 at a speed of 100 r.p.m. A low centrifuge speed is desirable to reduce leakage of cabin gas through the dynamic seals into the centrifuge, and to reduce bearing friction. The necessary speed reduction of 50 or 100:1 could be accomplished by the use of a single worm gear.

The inner bowl 12 is of sufficient size to allow the accumulation of solids for twenty-four hours without impairing operation. At the end of this period, the inlet is shut-off, the inner bowl is allowed to run dry, and the entire system is shut down. As shown in FIG. 1, the worm gear 21 forms a part of the cover for the inner bowl. At the end of the twenty-four hour cycle, with the unit shut down and cabin pressure within the unit, this cover may be removed, and the diaphragm, containing the solids, may be removed. The only other part of the system that has been in contact with the urine is the flexible urine inlet line 28, which may be easily cleaned or replaced. With a new diaphragm installed, the unit may be closed and set in operation again. Incidentally, it would be desirable to use a diaphragm made of a clinging plastic such as Saran to prevent gas occlusion between the diaphragm and inner bowl. If a bubble of cabin gas were occluded during the installation of the diaphragm, it would expand in volume by some 13 times as the inner bowl pressure drops from cabin pressure (5 p.s.i.a.) to operating pressure (0.363 p.s.i.a.). This would interfere rather drastically with heat transfer between the inner and outer bowls.

Three control loops and a timer system are provided to automate the system. The first of these, the inlet control loop 34, consists of level sensing probes 36, a relay 38 and a solenoid valve 40. When the liquid level within the inner bowl rises to the level of the probes, it closes a circuit 42 to the relay, which quickly closes the solenoid valve 40, cutting off the inlet flow. As the liquid level is reduced by vaporization, the probe circuit is opened, and the relay opens the circuit to the solenoid valve 40. This valve is normally open, but, by the use of a one-way hydraulic damper, will open only after a relatively long time after the circuit is opened. During this time, the liquid level is still going down due to vaporization. When the solenoid valve opens, it will fill the inner bowl to the level of the sensing probes. In this way, the maximum level of the inner bowl is closely controlled.

The outlet control loop 44 works in the same manner, with two exceptions. First, the interest is in positively maintaining a minimum rather than a maximum level. This would indicate that a relay 46 is used that is normally open, allow closing and quick opening. Secondly, a pump 48 is used to bring the distillate up to cabin pressure. The water is routed through a deionizer 50 prior to storage 30. This removes all undesirable ions. A conductivity probe 52 is used downstream of the deionizer to operate a warning light when the ion concentration exceeds a given level. This would indicate that the ion cartridge needs replacement.

With regard to the water storage vessel 30, it is not desirable to have the compression-distillation system operating if the water storage vessel is full. A microswitch 54 in the water storage vessel may be used to disengage the clutch 56 when the vessel is full, allowing the compressor 16 to idle, and keeping the centrifuge 8 in action to prevent contaminated water from being transferred directly to the outer bowl when the clutch is engaged again. Disengaging the clutch would equalize the inner and outer bowl pressures, halting evaporation and condensation. The water storage unit is connected to the atmosphere regeneration system, in order to allow for water reserve capacity for that system.

The vacuum purge control loop 58 is used to maintain the outer bowl 10 free of noncondensible gases. Any cabin gas that leaks into the inner bowl will be transferred to the outer bowl via the line 14 by the compressor 16, so that it is certain the inner bowl is free of noncondensible gases. However, these gases will, over a period of time, accumulate in the outer bowl, and, as the gases collect, their pressure will form a part of the total pressure in the outer bowl, which is maintained at given level by the compressor. As the pressure of the gases in the outer bowl builds up, the partial pressure of water is reduced. If this falls to the pressure level in the inner bowl, the condensation temperature in the outer bowl and the evaporation temperature in the inner bowl will be the same, and the heat and mass transfer between the inner and outer bowls will cease.

In order to maintain the total pressure in the outer bowl near the saturation pressure of water at the outer bowl temperatures, sensing elements 60, 62 for temperature and pressure are included in the outer bowl 10. A pressure transducer is used to provide a voltage proportional to the total pressure, and a thermistor 64 is used to provide a voltage proportional to temperature. The two voltages are subtracted in a crossover network 66, and the resulting voltage fed to a relay (see FIG. 1). When this voltage reaches a given threshold, the relay is closed, opening the vacuum purge 70 for a given length of time. This voltage threshold is proportional to the total pressure minus a constant times the temperature. Thus we have a purge threshold that requires a higher total pressure at higher temperatures.

A plot of this threshold is shown in FIG. 3. By the variation of the circuit parameters, the vacuum purge threshold may be adjusted to be a linear plot A that is slightly above the partial pressure of water B in the operating range of temperatures. The pressure of non-condensibles C that will cause vacuum purge may be seen to vary slightly with temperature. This happens because the electro-motive force substracted from the total pressure signal is linear with temperatures, whereas the partial pressure of water is slightly non-linear. (This could be corrected by using a self-balancing servo and a non-linear resistor in the thermopile circuit to simulate the non-linear partial pressure function. Considering the slight non-linearity of the function and the circuit complications necessary to reproduce this non-linearity, this further sophistication, with the associated weight and reliability penalty, is ordinarily not desirable.)

A basic disadvantage of the vacuum purge 70 is that it must necessarily discard water vapor each time the system is purged, reducing the recovery efficiency of the system. This disadvantage is combatted in two ways: by good seal design, which reduces the necessity for purge; and by partial recovery of the water vapor which is purged with the non-condensible gases. In FIG. 1, two dynamic seals are utilized. One, which is fairly large in diameter, seals the outer bowl from cabin pressure. The inner bowl, which is at an even lower pressure, is sealed by a smaller, and even more effective, seal. The centrifuge speed is held to a minimum to reduce the leakage rate. Before the purged gases are dumped overboard via line 72, they are routed to the emergency water recovery system via the line 73. This system, when not in operation, is normally at a very low temperature, and therefore has the capability of recovering a large proportion of the purged water vapor.

A timer is recommended for the overall cycle control, with functions to perform as given in FIG. 1. When the unit is shut down for cleaning, it should be dry and at cabin pressure. By cutting off the inlet 30 minutes before shutdown, dryness for the inner bowl is insured. All timer controlled valves will have manual overrides for emergency control.

The water levels within the centrifuge are sensitive to the gravity environment. In a gravity field, or under the action of "upward" acceleration, the water levels within the centrifuge will be horizontal, as shown at 74, if no spin is induced by the centrifuge. In a zero gravity (zero acceleration) environment, the spin of the centrifuge will hold the water level vertical as shown at 76 (see FIG. 1). With any combination of spin and upward acceleration, the angle of the water level will be somewhere between these two extremes, as given by the simple formula:

$$\theta = \arctan \frac{rw^2}{a} \quad 0 \leq \theta \leq 90°$$

where $\theta$ = water level angle.
$r$ = centrifuge radius.
$w$ = centrifuge angular velocity.
$a$ = upward acceleration.

The design of the centrifuge bowls, which slope downward away from the center of rotation, accommodates any variation of water level angle within these limits. In addition, the level sensing probes in the outer bowl are located along a 45° line from the outside corner of the centrifuge. Along this line, the water level does not change if there is a change in water level angle. The level sensing probes within the inner bowl are mounted on the flexible inlet hose, which also responds to gravity, along with the water level angle. Sustained operation of the compression distillation water recovery system requires that a well-defined liquid-gas interface be maintained in both the evaporator and condenser to prevent contamination of the recovered water. As shown in FIG. 1, artificial gravity is created by rotating the evaporator bowl which has vanes attached to the exterior of the bowl penetrating into the fluid in the condenser. This causes angular momentum to be transferred to the fluid in both bowls, thus maintaining the required liquid-gas interface. The unique "kidney bean" shape of both bowls allows the level sensing probes 60, 62 to be positioned so that the same depth of fluid is indicated regardless of changes in the liquid-gas interface angle created by changes in the environmental gravity field.

With the inclusion of these design features, the system has the capability of continuous operation in any gravity environment, from takeoff acceleration to zero gravity, and including transitions between various acceleration environments. These features would be particularly desirable if the space vehicle were to use some form of propulsion, such as ion propulsion, which produces subgravity conditions for extended periods of time.

In the event of temporary or permanent breakdown of the compression-distillation water recovery system, reserve capability is provided by the emergency water recovery system 78. This system operates on the principle of vacuum distillation, with the necessary heat flow provided by the normal rejection of heat from the cabin. Waste water is held in sponges which are in contact with a panel that is exposed to the cabin. The condensation sponges are held in contact with a panel that is exposed to outer space, and the volume between the panels is evacuated. As heat is rejected from the outer panel, heat is transferred between the panels. Because the space between the panels is evacuated, the principal mode of heat transfer is by the evaporation and recondensation of water vapor onto the condensation sponges. An effective recovery system for contaminated water has thus been described. When the purified water storage tank 30 is full, the control means 54 stops further distillation until the level of the tank is lowered.

Obviously many modifications and variations of the present invention are possible in the light of the above teachings. It is therefore to be understood that within the scope of the appended claims the invention may be practiced otherwise than as specifically described.

What is claimed is:
1. A water regeneration system of the character described comprising:
   storage chamber means for collecting and storing contaminated water;
   a heat exchanging centrifuge comprising a stationary outer shell which is symmetrical about a vertical axis and is kidney bean shaped in vertical section, and an inner shell which is symmetrical about said vertical axis and kidney bean shaped in vertical section, said inner shell defining an evaporation chamber therein and having a neck portion protruding upwardly through an opening in said outer shell and engaged by bearing and sealing means for supporting said inner shell within said outer shell for rotation about said axis, said inner and outer shells defining a condensation chamber therebetween, gear and closure means removably secured to said neck portion in closing relation thereto;
   motor means connected to said inner shell by means of said gear and closure means for rotating said inner shell about said vertical axis whereby contaminated water in said inner shell will be centrifugally held at the periphery of said inner shell irrespective of zero gravity forces thereon;
   conduit and valve means connected between said first storage chamber means and said inner shell for conducting contaminated water into said evaporation chamber;
   compressor means connected to said motor in driven relation thereto and having intake and output ports;
   conduit means connected between said evaporation chamber and the intake port of said compressor;
   conduit means connected between the output port of said compressor and said condensing chamber whereby compressed water vapor introduced into said condensing chamber gives up heat to contaminated water in said evaporating chamber through the wall of said inner shell;
   outlet conduit and valve means connected to said condensation chamber at the periphery of said outer shell for withdrawing regenerated water therefrom;
   said inner rotatable shell comprising a plurality of vanes extending radially into said condensation chamber for effecting rotation of water in said condensation chamber upon said rotation of said inner shell whereby water in said condensation chamber is centrifugally held at the periphery of said condensation chamber irrespective of zero gravity effects thereon;
   an elongated, liquid level sensing probe extending inwardly of said condensation chamber from the periphery thereof, said probe being disposed with its longitudinal axis inclined at approximately 45 degrees to said vertical axis whereby substantially the same amount of said probe is immersed by a given quantity of water in said condensation chamber irrespective of gravity conditions and/or upward accelerations of said water regeneration apparatus in the direction of said vertical axis;

electrically operable pump means connected to said outlet conduit and valve means for withdrawing condensed water from said condensation chamber; and relay means responsive to sensing by said probe of a predetermined quantity of water in said chamber to initiate operation of said electrically operable pump means.

2. A water regeneration system as defined in claim 1 and comprising:

a flexible plastic diaphragm disposed in said inner shell against and conforming to the inner surfaces thereof;

said diaphragm being removable through said neck portion for removal of accumulated solids from said evaporation chamber.

References Cited

UNITED STATES PATENTS

| | | | |
|---|---|---|---|
| 604,550 | 5/1898 | Stretch | 202—181 |
| 2,352,069 | 6/1944 | Beline. | |
| 2,441,361 | 5/1948 | Kirgan. | |
| 2,647,862 | 8/1953 | Whitney | 203—89 |
| 2,734,023 | 2/1956 | Hickman | 202—236 |
| 2,899,366 | 8/1959 | Hickman | 202—236 |
| 2,996,439 | 8/1961 | Glover | 203—89 |
| 3,056,651 | 10/1962 | McIlhenny | 203—10 |
| 3,169,102 | 2/1965 | Weiswurm | 203—10 |
| 3,238,111 | 3/1966 | Harper | 203—2 |
| 3,282,798 | 11/1966 | Tidball | 203—26 |

NORMAN YUDKOFF, *Primary Examiner.*

WILBUR L. BASCOMB, JR., *Examiner.*